United States Patent
Deshpande et al.

(10) Patent No.: US 11,209,062 B2
(45) Date of Patent: Dec. 28, 2021

(54) AUTOMATIC SLACK ADJUSTER

(71) Applicant: Bendix Spicer Foundation Brake LLC, Elyria, OH (US)

(72) Inventors: Madhav Deshpande, Avon Lake, OH (US); Raosaheb Tambe, Kiwale (IN); Lawrence F. Gilboy, Amherst, OH (US); John M. Louis, North Ridgeville, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 347 days.

(21) Appl. No.: 16/412,640

(22) Filed: May 15, 2019

(65) Prior Publication Data

US 2020/0362930 A1    Nov. 19, 2020

(51) Int. Cl.
*F16D 65/14* (2006.01)
*F16D 65/60* (2006.01)
*F16D 65/22* (2006.01)

(52) U.S. Cl.
CPC ............. *F16D 65/60* (2013.01); *F16D 65/22* (2013.01)

(58) Field of Classification Search
CPC .......... F16D 65/60; F16D 65/52; F16D 65/22; F16D 65/70
See application file for complete search history.

(56) References Cited

U.S. PATENT DOCUMENTS

| | | | |
|---|---|---|---|
| 4,440,268 A | 4/1984 | Karlsson | |
| 4,484,665 A * | 11/1984 | Svensson | F16D 65/60 188/196 BA |
| 4,825,979 A | 5/1989 | Svensson | |
| 7,757,824 B2 * | 7/2010 | Echambadi | F16D 65/60 188/79.55 |
| 8,215,460 B2 | 7/2012 | Li | |
| 8,245,820 B2 | 8/2012 | Echambadi et al. | |

(Continued)

FOREIGN PATENT DOCUMENTS

| CN | 2630563 Y | 8/2004 |
|---|---|---|
| CN | 2898432 Y | 5/2007 |

(Continued)

OTHER PUBLICATIONS

Machine translation of CN 100501184 (no date).*
(Continued)

*Primary Examiner* — Nicholas J Lane
(74) *Attorney, Agent, or Firm* — Reising Ethington P.C.

(57) ABSTRACT

A clearance sensing vehicle brake slack adjuster includes a housing coupled to a brake actuator and supporting a driving worm wheel engaging the brake cam shaft and a driving worm screw having a threaded portion meshed with the driving worm wheel and transferring a brake actuating force, imparted by the brake actuator to the housing, to the driving worm wheel and cam shaft. A wear adjustment mechanism for the adjuster includes a control worm wheel and a clutch ring disposed about the driving worm screw and a wrap spring engaging surfaces of the control worm wheel and the clutch ring. The control worm wheel is in mesh with a control worm screw. The clutch ring is disposed on a side of the control worm wheel opposite the threaded portion of the driving worm screw and includes teeth engaging corresponding teeth on the driving worm screw.

15 Claims, 3 Drawing Sheets

(56) References Cited

U.S. PATENT DOCUMENTS

| | | | |
|---|---|---|---|
| 8,302,742 | B2 | 11/2012 | Louis et al. |
| 8,302,744 | B2 | 11/2012 | Louis |
| 8,973,722 | B2 | 3/2015 | Kromer et al. |
| 2010/0122878 | A1 | 5/2010 | Louis et al. |
| 2010/0288590 | A1* | 11/2010 | Echambadi ........... F16D 65/562 188/79.51 |
| 2011/0073422 | A1 | 3/2011 | Li |
| 2016/0333952 | A1* | 11/2016 | Keller .................... F16D 65/68 |
| 2019/0345998 | A1* | 11/2019 | Louis ....................... F16H 1/16 |

FOREIGN PATENT DOCUMENTS

| | | | |
|---|---|---|---|
| CN | 201025286 | Y | 2/2008 |
| CN | 201100353 | Y | 8/2008 |
| CN | 100501184 | C | 6/2009 |
| CN | 201373050 | Y | 12/2009 |
| CN | 202349054 | U | 7/2012 |
| CN | 102927177 | A | 2/2013 |
| CN | 202746467 | U | 2/2013 |
| CN | 107781328 | A | 3/2018 |
| CN | 207569112 | U | 7/2018 |
| CN | 108458014 | A | 8/2018 |
| EP | 0030766 | A1 | 6/1981 |
| EP | 0598290 | A1 | 5/1994 |
| WO | 2003083322 | A1 | 10/2003 |
| WO | 2011016047 | A1 | 8/2012 |

OTHER PUBLICATIONS

International Search Report issued in corresponding International (PCT) Patent Application No. PCT/US2020/032285 (dated Jul. 23, 2020).
Written Opinion issued in corresponding International (PCT) Patent Application No. PCT/US2020/032285 (dated Jul. 23, 2020).
Bendix Commercial Vehicle Systems LLC, "Bendix Versajust Automatic Slack Adjuster," SD-05-4630 (2011).
Haldex Brake Products Corp., "Haldex S-ABA the Self-setting Automatic Brake Adjuster" (2012).
English (machine) translation of CN2898432Y.
English (machine) translation of CN201025286Y.
English (machine) translation of CN201100353Y.
English (machine) translation of CN100501184C.
English (machine) translation of CN201373050Y.
English (machine) translation of CN202349054U.
English (machine) translation of CN102927177A.
English (machine) translation of CN202746467U.
English (machine) translation of CN107781328A.
English (machine) translation of CN207569112U.
English (machine) translation of CN108458014A.

* cited by examiner

AUTOMATIC SLACK ADJUSTER

BACKGROUND OF THE INVENTION a. Field of the Invention

This invention relates to automatic slack adjusters for vehicle brakes. In particular, the invention relates to an automatic slack adjuster having a wear adjustment mechanism that reduces part count, simplifies design and manufacturing and provides robust and consistent performance.

b. Background Art

In conventional vehicle brakes, a brake actuator moves friction linings into engagement with a friction surface to brake rotation of a wheel. Over time, the friction linings exhibit wear and the distance between the friction linings and the friction surface increases. As a result, the brake actuator has to continually increase its range of motion to move the friction linings into engagement with the friction surface. In order to reduce or eliminate this excess motion, slack adjusters may be placed in the mechanical path between the brake actuator and the friction linings. The slack adjuster transfers actuating forces from the brake actuator to the friction linings, but also adjusts the position of the friction linings relative to the friction surface in order to maintain a predetermined clearance between the friction linings and friction surface despite wear on the friction linings. In a conventional drum brake, for example, a slack adjuster may be located between the brake actuator and a cam shaft that moves one or more brake shoes having friction linings into engagement with the surface of a brake drum. The slack adjuster may have a housing coupled to a push rod extending from the brake actuator and may be configured to receive and engage the cam shaft such that linear motion of the push rod is translated into rotational motion of the slack adjuster housing and cam shaft. When the brake is released, if the clearance between the friction linings and friction surface is greater than a predetermined clearance, the slack adjuster is permitted to rotate relative to the cam shaft for an angular distance corresponding to the excess clearance in order to limit the distance the friction linings are withdrawn from the friction surface and maintain the predetermined clearance.

In order to allow the slack adjuster to transfer brake actuating forces from the brake actuator to the cam shaft or another structure, but also move relative to that structure when adjusting the clearance between the friction linings and friction surface, the slack adjuster typically includes a one-way clutch. In some conventional slack adjusters, the one-way clutch is located along the axis of a control worm screw that (i) extends perpendicular to the rotational axis of a driving worm screw in engagement with a driving worm wheel coupled to the brake cam shaft and (ii) engages a control worm wheel disposed about the same rotational axis. The control worm screw, however, is relatively small. As a result, the components of the clutch are relatively small leading to difficulties in design, manufacturing and repair and have relatively little strength. Other conventional slack adjusters locate the one-way clutch along the rotational axis of the driving worm screw in an attempt to overcome some of these issues. Conventional designs, however, are often overly complex and place undue stress on the control worm wheel.

The inventors herein have recognized a need for an automatic slack adjuster for a vehicle brake that will minimize and/or eliminate one or more of the above-identified deficiencies.

BRIEF SUMMARY OF THE INVENTION

This invention relates to automatic slack adjusters for vehicle brakes. In particular, the invention relates to an automatic slack adjuster having a wear adjustment mechanism that reduces part count, simplifies design and manufacturing and provides robust and consistent performance.

An automatic slack adjuster for a vehicle brake in accordance with one embodiment includes a housing configured for coupling to a brake actuator. The slack adjuster further includes a driving worm wheel supported by the housing and configured to engage a brake cam shaft of the vehicle brake. The slack adjuster further includes a driving worm screw supported by the housing. The driving worm screw defines a threaded portion in mesh with the driving worm wheel and first and second shaft portions extending from opposite sides of the threaded portion. The driving worm screw is configured to transfer a brake actuating force, imparted by the brake actuator to the housing, to the driving worm wheel and the brake cam shaft. The slack adjuster further includes a spring configured to apply a biasing force to the first shaft portion of the driving worm screw to bias the driving worm screw in a first direction. The slack adjuster further includes a wear adjustment mechanism. The wear adjustment mechanism includes a reference arm assembly configured to be fixed against movement and including a control ring gear. The adjustment mechanism further includes a pinion gear in mesh with the control ring gear and configured for rotation about a rotational axis. The adjustment mechanism further includes a control worm screw coupled to the pinion gear for rotation with the pinion gear about the rotational axis and a control worm wheel disposed about the second shaft portion of the driving worm screw and in mesh with the control worm screw. The adjustment mechanism further includes a clutch ring disposed about the second shaft portion of the driving worm screw on an opposite side of the control worm wheel relative to the threaded portion of the driving worm screw. The clutch ring includes a plurality of teeth configured for engagement with a corresponding plurality of teeth on the second shaft portion of the driving worm screw. The adjustment mechanism further includes a wrap spring engaging surfaces of the control worm wheel and the clutch ring.

An automatic slack adjuster for a vehicle brake in accordance with another embodiment includes a housing configured for coupling to a brake actuator. The slack adjuster further includes a driving worm wheel supported by the housing and configured to engage a brake cam shaft of the vehicle brake. The slack adjuster further includes a driving worm screw supported by the housing and in mesh with the driving worm wheel. The driving worm screw is configured to transfer a brake actuating force, imparted by the brake actuator to the housing, to the driving worm wheel and the brake cam shaft. The slack adjuster further includes a spring configured to apply a biasing force to the driving worm screw to bias the driving worm screw in a first direction. The slack adjuster further includes means for adjusting a position of the driving worm wheel to compensate for wear in the vehicle brake.

An automatic slack adjuster for a vehicle brake in accordance with the invention represents an improvement as compared to conventional slack adjusters. In particular, the inventive slack adjuster locates the one-way clutch along the axis of the driving worm screw. As a result, the components of the clutch can be made larger than in conventional slack adjusters that locate the one-way clutch along the axis of the control worm screw. The larger size simplifies, design, manufacturing and repair and increases the strength of the clutch. Further, as compared to conventional slack adjusters that locate the one-way clutch along the axis of the driving worm screw, the inventive slack adjuster simplifies design and assembly of the slack adjuster and limits stress on the control worm wheel.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
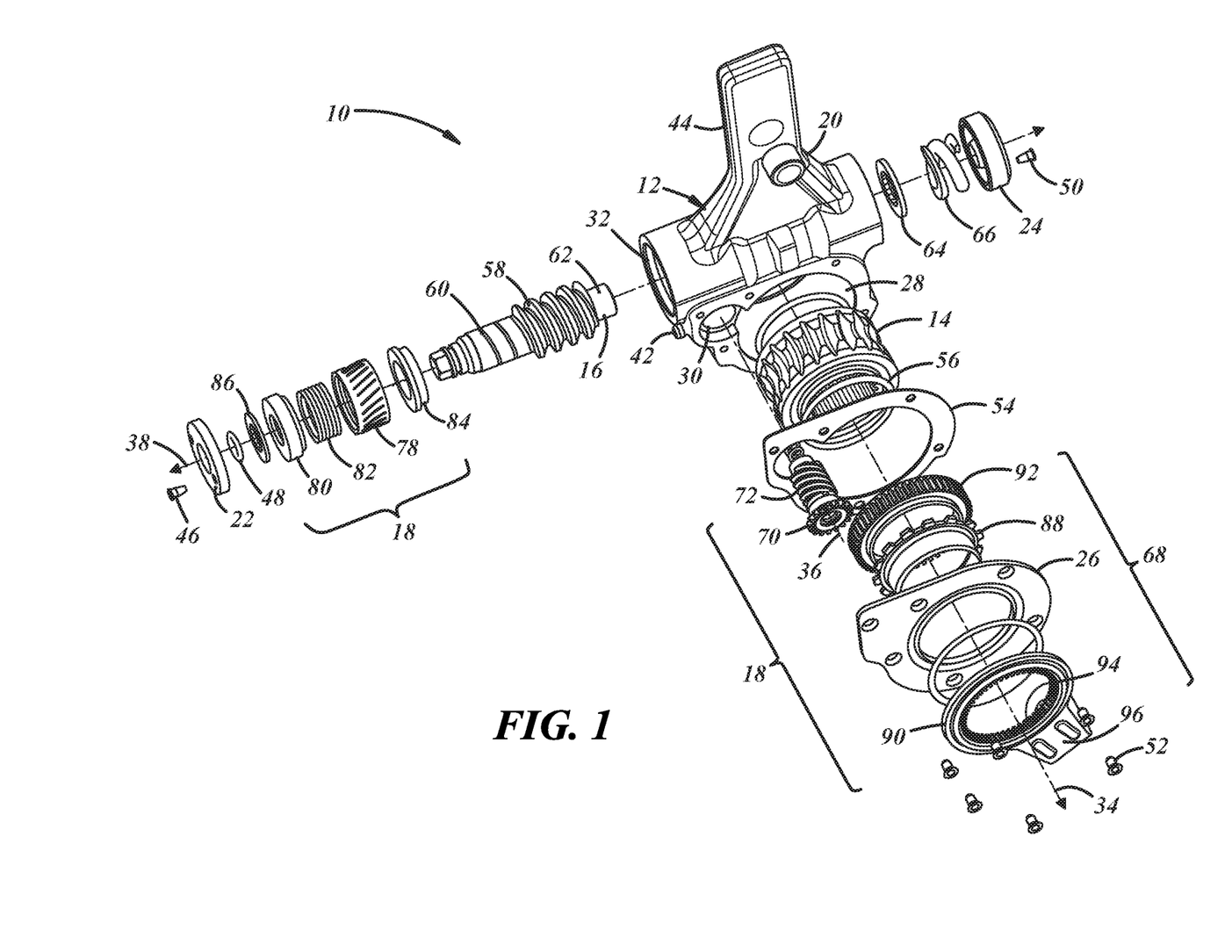
FIG. 1 is an exploded view of an automatic slack adjuster in accordance with one embodiment of the present teachings.

Referring now to the drawings wherein like reference numerals are used to identify identical components in the various views, FIG. 1 illustrates an automatic slack adjuster 10, or brake lever, for a vehicle brake in accordance with one embodiment of the present teachings. Adjuster 10 is provided to transmit forces from a brake actuator to a brake cam shaft and to adjust the distance between the friction linings of the brake and a friction surface to maintain a predetermined clearance between the friction linings and friction surface. Adjuster 10 is particularly configured for use with vehicle drum brakes on heavy commercial vehicles such as trucks, trailers and buses in which an S-cam at one end of a cam shaft is rotated to move a pair of brake shoes carrying friction linings into and out of engagement with a brake drum. It should be understood, however, that assembly 10 may find application on a wide variety of vehicles. Assembly 10 may include a housing 12, a driving worm wheel 14, a driving worm screw 16 and means, such as wear adjustment mechanism 18, for adjusting a position of the driving worm wheel 14 to compensate for wear in the vehicle brake friction linings.

Figure 2:
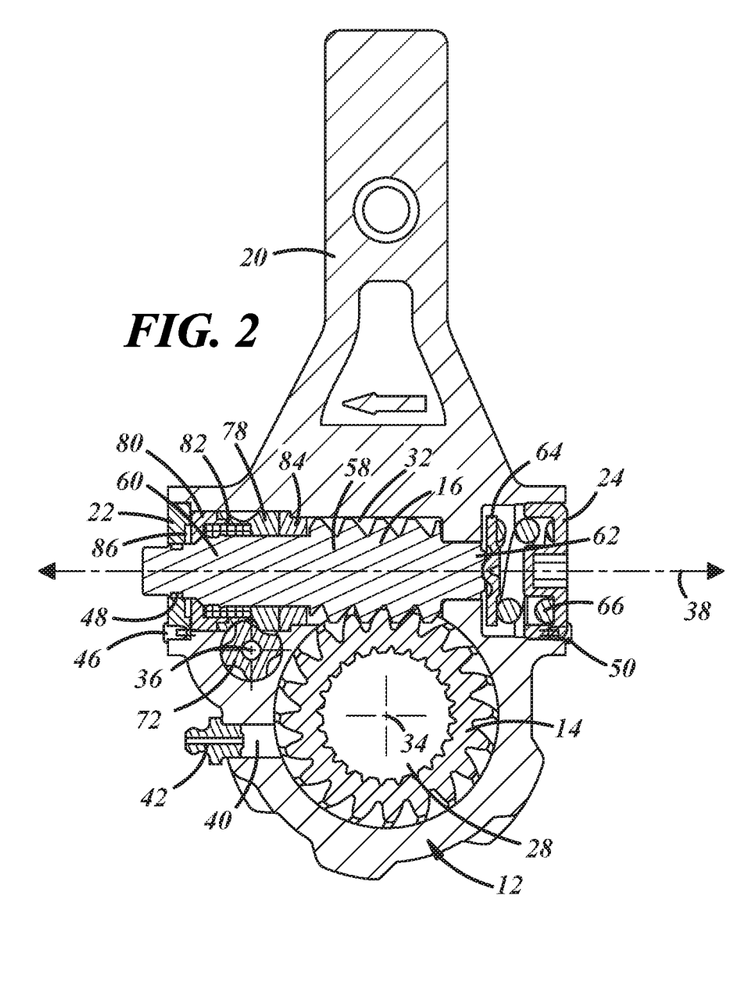
FIG. 2 is a cross-sectional view of the automatic slack adjuster of FIG. 1.

Housing 12 is provided to position and orient the other components of slack adjuster 10, protect those components from foreign objects and elements, and to transfer brake actuating forces from a brake actuator. Housing 12 may include a body 20 and several cover plates 22, 24, 26 configured to close openings in housing 12. Body 20 supports, positions and orients the other components of slack adjuster 10. Body 20 defines three longitudinal bores 28, 30, 32 extending along, and centered about, three distinct axes 34, 36, 38. Bore 28 is a closed bore disposed about axis 34 and is configured to receive driving worm wheel 14 among other components. Bore 30 is a closed bore disposed about axis 36 and is configured to receive components of wear adjustment mechanism 18. Axis 36 extends in a direction parallel to axis 34. Bore 32 is a through bore disposed about axis 38 and is configured to receive driving worm screw 16 and additional components of wear adjustment mechanism 18 among other components. Axis 38 extends in a direction that is generally perpendicular to the direction of axes 32, 34. Referring to FIG. 2, body 20 may further define a lubricant passage 40 extending from bore 28 through which grease or other lubricants may be provided using a zerk or nipple 42 located at one end of passage 40. Referring again to FIG. 1, body 20 further defines an arm 44 that may be configured to engage one end of a push rod extending from a brake actuator. Linear movement of the pushrod acting on arm 44 causes rotation of housing 12 that is translated into rotational movement of the brake cam shaft through driving worm wheel 14 and driving worm screw 16. Cover plates 22, 24 are configured to close opposite longitudinal ends of bore 32. Cover plate 22 may be secured to body 20 using one or more fasteners 46 such as bolts or screws. Cover plate 22 includes a central aperture configured to receive one end of driving worm screw 16. A seal 48 may be disposed between driving worm screw 16 and cover plate 22. Cover plate 24 may also be secured to housing 12 using one or more fasteners 50. Cover plate 26 is configured to close bore 30. Cover plate 26 may be secured to body 20 using one or more fasteners 52 such as bolts or screws and a gasket 54 may be disposed between cover plate 26 and body 20.

Driving worm wheel 14 is provided to transfer brake actuating forces to a brake cam shaft. Wheel 14 is configured to be received within bore 28 and may be disposed about, and centered about, axis 34. Wheel 14 may define one or more keys/keyways or splines on a radially inner surface configured to engage mating keyways/keys or splines on the brake cam shaft to rotatably couple wheel 14 and the cam shaft. Wheel 14 defines one or more teeth on a radially outer surface configured to mesh with driving worm screw 16. In the illustrated embodiment wheel 14 comprises a throated or enveloping worm wheel 14 in which the teeth increase in diameter moving from a longitudinal center of each tooth towards the longitudinal ends of the tooth. Wheel 14 may further define circular grooves at either end of wheel 14 configured to receive seals 56.

Driving worm screw 16 transfers brake actuating forces from housing 12 to worm wheel 14. Screw 16 is configured to be received within bore 32 and may be disposed about, and centered about, axis 38. Screw 16 includes a body defining a threaded portion 58 and unthreaded shaft portions 60, 62 extending from opposite sides of threaded portion 58. Threaded portion 58 is in mesh with the teeth of worm wheel 14. Shaft portion 60 is configured to support elements of wear adjustment mechanism 18 as described in greater detail below. One end of shaft portion 60 extends through cover plate 22 and may define one or more flats configured to allow screw 16 to be gripped by a tool and through which screw 16 may be manually rotated to adjust the position of worm wheel 14 and the brake cam shaft. Shaft portion 62 is configured to engage a spring seat 64 for a spring 66 that is seated between cover plate 24 and seat 64. Spring 66 is configured to apply a biasing force to an axial end of shaft portion 62 of driving worm screw 16 in order to bias driving worm screw 16 in one direction along axis 38 (to the left in FIG. 2) and engage a clutch formed between worm screw 16 and a component of wear adjustment mechanism 18 as described in greater detail below. Spring 66 may comprise a heavy coil spring or stack of disc springs.

Figure 3:
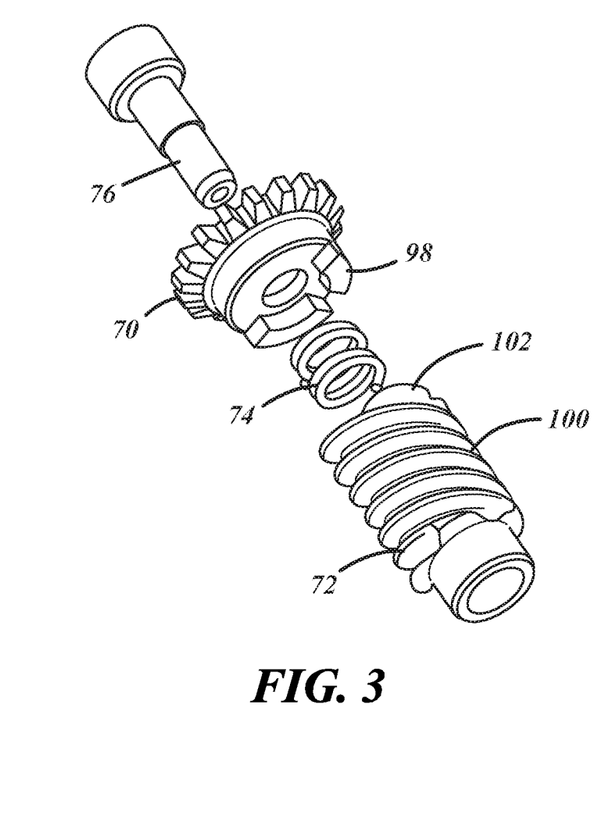
FIG. 3 is an exploded perspective view of a portion of the wear adjustment mechanism of the slack adjuster of FIG. 1.

Wear adjustment mechanism 18 provides a means for adjusting a position of the driving worm wheel 14, and therefore the brake cam shaft and friction linings, to compensate for wear in the friction linings. Adjustment mechanism 18 may include a reference arm assembly 68. Referring to FIG. 3, mechanism 18 may also include a pinion gear 70, a control worm screw 72, a torsion spring 74, and a spindle 76. Referring to FIGS. 1-2, mechanism 18 may further include a control worm wheel 78, a clutch ring 80, a wrap spring 82, and thrust bearings 84, 86.

Referring to FIG. 1, reference arm assembly 68 provides a fixed reference used in adjusting the position of slack adjuster 12 to compensate for wear in the brake linings. Assembly 68 may include a support sleeve 88, an arm 90, and a control ring gear 92. Sleeve 88 supports arm 90 and ring gear 92 and couples arm 90 and gear 92 for rotation together with sleeve 88. Sleeve 88 includes a cylindrical body configured to support arm 90 and ring gear 92 and defines a radially outwardly extending flange at one end having a plurality of teeth configured to be received within corresponding cavities in ring gear 92 to prevent relative movement between sleeve 88 and ring gear 92. Arm 90 includes an annular body 94 and a mounting flange 96 extending from body 94 that is secured to a fixed point on the vehicle chassis such as the vehicle axle. Body 94 includes a plurality of teeth on a radially inner surface configured to engage a radially outer surface of the cylindrical body of sleeve 88 in order to couple arm 90 to sleeve 88 and prevent relative movement between arm 90 and sleeve 88 (the teeth on body 94 of arm 90 may be made of a softer material than the material of sleeve 88 such that the teeth deform as sleeve 88 is inserted through arm 90 to securely couple arm 90 to sleeve 88). Ring gear 92 is annular in shape and includes a plurality of teeth on a radially outer surface configured to mesh with teeth on pinion gear 70.

Pinion gear 70 drives control worm screw 72. Pinion gear 70 is disposed with bore 30 in housing 12. Pinion gear 70 may be disposed about, and centered about, axis 36 and may be fixed again movement along axis 36. Pinion gear 70 defines a plurality of teeth on a radially outer surface that mesh with corresponding teeth on control ring gear 92. Referring to FIG. 3, pinion gear 70 is annular in shape and is sized to receive a spindle 76. Pinion gear 70 defines a circumferential rib 98 at one end. Rib 98 has angular drive faces at either circumferential end for a purpose described below. Rib 98 is split to define a notch configured to receive one tang of torsion spring 74.

Control worm screw 72 drives control worm wheel 78. Referring to FIG. 1, control worm screw 72 is disposed within bore 30 in housing 12. Screw 72 may be disposed about, and centered about, axis 36 and may be fixed against movement along axis 36. Referring again to FIG. 3, screw 72 annular in shape and configured to receive spindle 76. Screw 72 includes one or more helical threads 100 on a radially outer surface configured to mesh with corresponding teeth in control worm wheel 78. Control worm screw 72 defines a circumferential rib 102 at one end that is disposed within a common plane with rib 98 in pinion gear 70 such that rib 102 is disposed circumferentially between the circumferential ends of rib 98 in pinion gear 70. Rib 102 has angular drive faces at either circumferential end that are configured to engage corresponding opposing drive faces on rib 98 in pinion gear 70. The ribs 98, 102 in pinion gear 70 and control worm screw 72 are sized to establish a gap between corresponding drive faces on the ribs 98, 102 corresponding to the desired clearance between the friction linings and friction surface in the brake. Control worm screw 72 defines a notch configured to receive one tang of torsion spring 74.

Torsion spring 74 couples pinion gear 70 and control worm screw 72 and maintains engagement between the corresponding drive faces in the ribs in pinion gear 70 and control worm screw 72 during application of the vehicle brake. Spring 74 has tangs at either end that extending into corresponding notches formed in pinion gear 70 and clutch ring 72.

Spindle 76 supports pinion gear 70, control worm screw 72 and torsion spring 74 and maintains the alignment of these components. Spindle 76 has a shank that extends through pinion gear 70 and into one end of control worm screw 72. A head at one longitudinal end of spindle 76 may be received within a counterbore formed within pinion gear 70.

Figure 4:
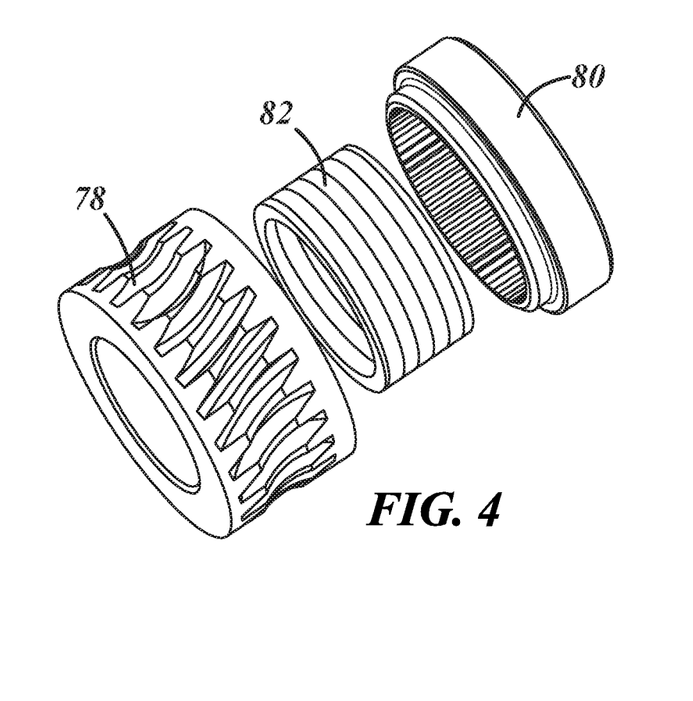
FIGS. 4-5 are exploded and assembled perspective views of another portion of the wear adjustment mechanism of the slack adjuster of FIG. 1.
Figure 5:
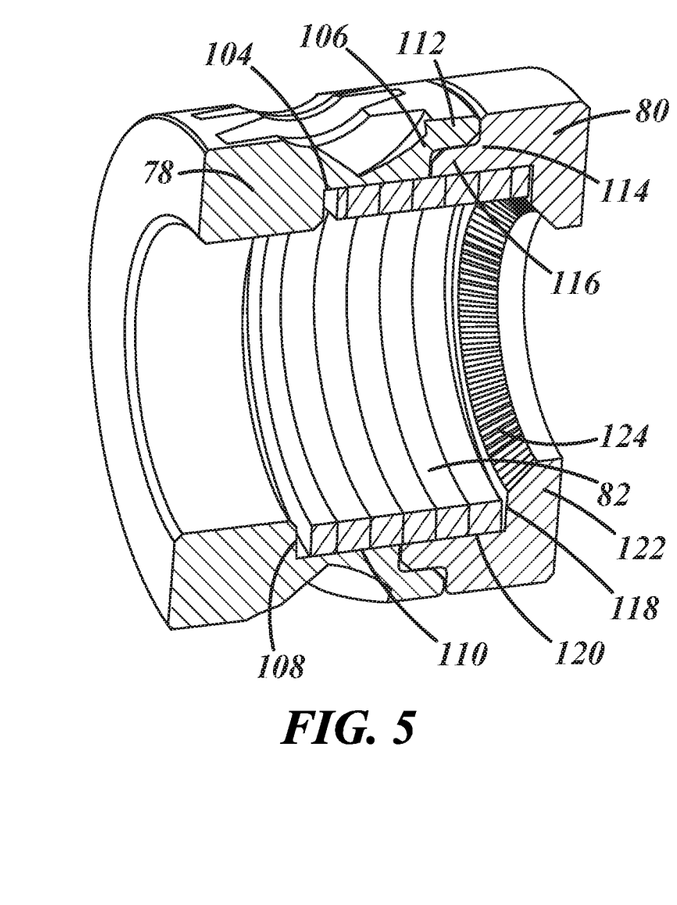

Referring again to FIGS. 1-2, control worm wheel 78 is provided to adjust the position of driving worm screw 16 (and therefore, driving worm wheel 14 and the brake cam shaft) when the clearance between the friction linings and friction surfaces exceeds a predetermined clearance. In accordance with one aspect of the present teachings, control worm wheel 78 also functions as part of a one-way clutch. Control worm wheel 78 is disposed within bore 32 and may be disposed about, and centered about, axis 38. Control worm wheel 78 is in mesh with control worm screw 72. Wheel 78 defines one or more teeth on a radially outer surface configured to mesh with the threads on control worm screw 72. Referring to FIGS. 4-5, in the illustrated embodiment wheel 78 comprises a throated or enveloping worm wheel 78 in which the teeth increase in diameter moving from a longitudinal center of each tooth towards the longitudinal ends of the tooth. Control worm wheel 78 is configured for rotation with driving worm screw 16 under certain operating conditions as described below. Referring to FIG. 2, control worm wheel 78 is supported on shaft portion 60 of driving worm screw 16 between clutch ring 80 and thrust bearing 84. Referring to FIG. 5, the inner diameter of control worm wheel 78 varies to define shoulders 104, 106. A radially extending surface 108 of shoulder 104 defines a spring seat for one end of wrap spring 82. An axially extending surface 110 is configured for engagement with wrap spring 82 during engagement of the clutch. Shoulder 106 is configured to receive an axially extending portion of clutch ring 80 such that the control worm wheel 78 and clutch ring 80 radially overlap to help ensure coaxial movement of control worm wheel 78 and clutch ring 80 along axis 38. An axially extending end portion 112 of control worm wheel 78 is disposed radially outwardly of a portion of clutch ring 80. It should be understood, however, that control worm wheel 78 and clutch ring 80 may alternatively be configured such that a portion of clutch ring 80 is dispose radially outwardly of a portion of control worm wheel 78.

Clutch ring 80 forms one part of a one-way clutch with control worm wheel 78. Clutch ring 80 also forms part of a clutch with driving worm screw 16. Referring to FIGS. 1-2, clutch ring 80 is disposed within bore 32 of housing 12. Clutch ring 80 may be disposed about, and centered about, axis 38. Clutch ring 80 is configured for rotation with driving worm screw 16 under certain operating conditions and with control worm wheel 78 under certain operating conditions as described below. Clutch ring 80 is supported on shaft portion 60 of driving worm screw between control worm wheel 78 and thrust bearing 86. In accordance with one aspect of the present teachings, clutch ring 80 is disposed on an opposite side of control worm wheel 78 relative to threaded portion 58 of driving worm screw 16. In this manner, the design and assembly of adjuster 10 is simplified relative to conventional slack adjusters. Referring to FIG. 5, the outer diameter of clutch ring 80 varies to define a shoulder 114. Shoulder 114 complements shoulder 106 in control worm wheel 78 such that an axially extending end portion 116 of clutch ring 80 is disposed radially inwardly of portion 112 of control worm wheel 78. The inner diameter of clutch ring 80 also varies and defines a shoulder 116. A radially extending surface 118 of shoulder 114 defines a spring seat for one end of wrap spring 82. An axially extending surface 120 of shoulder 114 is configured for engagement with a portion of wrap spring 82 during engagement of the clutch. The inner diameter of clutch ring 80 tapers adjacent radially extending surface 120. This tapered portion 122 of clutch ring 80 defines a plurality of teeth 124. Referring to FIG. 1, the teeth 124 on tapered portion 122 are configured to mesh with teeth on a complementary tapered portion of shaft portion 60 of driving worm screw 16 to allow torque transfer between driving worm screw 16 and clutch ring 80. The forces exerted by spring 66 on driving worm screw 16 bias worm screw 16 towards engagement with clutch ring 80 to engage the clutch.

Wrap spring 82 cooperates with control worm wheel 78 and clutch ring 80 to form a one-way clutch. In particular, when control worm wheel 78 rotates in one direction, spring 82 expands and increases the friction between spring 82 and the inner surfaces of control worm wheel 78 and clutch ring 80 to prevent relative rotation between control worm wheel 78 and clutch ring 80. When control worm wheel 78 rotates in the opposite direction, spring 82 contracts, thereby decreasing the friction between spring 82 and the inner surfaces of control worm wheel 78 and clutch ring 80 to allow relative rotation between control worm wheel 78 and clutch ring 80. Wrap spring 82 is disposed about shaft portion 60 of driving worm screw 16 and engages radially inner surfaces of control worm wheel 78 and clutch ring 80 such that only wrap 82 is disposed between a radially outer surface of shaft portion 60 of driving worm screw 16 and the radially inner surfaces of control worm wheel 78 and clutch ring 80. The use of wrap spring 82 enables slack adjuster 10 to perform continuous adjustment as opposed to being limited to discrete adjustments as in many conventional slack adjusters employing toothed one-way clutches.

Thrust bearings 84, 86 permit rotation of control worm wheel 78 and clutch ring 80, respectively, relative to housing 12. Thrust bearings 84, 86 are disposed within bore 32 and may be disposed about, and centered about, axis 38. Thrust bearings 84, 86 are annular in shape. Thrust bearings 84, 86 may be supported on shaft portion 60 of driving worm screw 16 and may be configured for rotation with driving worm screw 16 by forming the radially inner surfaces of thrust bearings, 84 86 and the radially outer surface of worm screw 16 with complementary shapes (e.g., key/keyway, flats, etc.). Thrust bearing 84 is disposed axially between the threaded portion 58 of driving worm screw 16 and control worm wheel 78. Thrust bearing 86 is disposed axially between cover plate 22 of housing 12 and clutch ring 80.

Slack adjuster 10 operates in the following manner. During application of the brake, the brake actuator extends a push rod. Because the push rod is connected to arm 44 of housing 12, housing 12 is caused to rotate about axis 34. Housing 12 carries driving worm screw 16. Because of the engagement of driving worm screw 16 and driving worm wheel 14, rotation of housing 12 thereby results in rotation of driving worm wheel 14 about axis 34. Because driving worm wheel 14 is coupled to the brake cam shaft, this action causes the cam shaft to also rotate about axis 34 to urge a pair of brake shoes bearing friction linings towards the friction surface in a brake drum. The rotation of housing 12 also results in rotation of pinion gear 70 about axis 36 as it rides along stationary control ring gear 92. Referring to FIG. 3, during application of the brake, one set of angular drive faces on rib 98 of pinion gear 70 and rib 102 on control worm screw 72 are in engagement. Therefore, rotation of pinion gear 70 also results in rotation of control worm screw 72 about axis 36. Referring again to FIGS. 1-2, rotation of control worm screw 72 causes corresponding rotation of control worm wheel 78 about axis 38. When control worm wheel 78 rotates in this direction, wrap spring 82 is deformed in a manner that reduces the friction between wrap spring 82 and control worm wheel 78 and clutch ring 80 and, therefore, control worm wheel 78 rotates relative to, or freewheels relative to, clutch ring 80. Once the friction linings of the brake engage the friction surface, a reaction load is transmitted through the brake cam shaft and driving worm wheel 14 to driving worm screw 16. This load overcomes the force of spring 66 and causes movement of driving worm screw 16 (to the right in FIG. 2) thereby disengaging the clutch between driving worm screw 16 and clutch ring 80. As the brake is released, pinion gear 70 begins to rotate in the opposite rotational direction about axis 36 as it rides along stationary control ring gear 92 in the opposite direction. The tension in torsion spring 74 causes rotation of control worm screw 72 in the same direction as pinion gear 70. Rotation of control worm screw 72 causes a corresponding rotation in control worm wheel 78 in the opposite direction about axis 38. Rotation of control worm wheel 78 in this direction deforms wrap spring 82 in a manner that increases the friction between wrap spring 82 and control worm wheel 78 and clutch ring 80 thereby engaging the one-way clutch between control worm wheel 78 and clutch ring 80. As a result, control worm wheel 78 and clutch ring 80 are caused to rotate about axis 38 in the same direction. Once the friction linings disengage from the friction surface, the reaction load on driving worm screw 16 decreases and spring 66 again causes movement of driving worm screw 16 (to the left in FIG. 2) to engage the clutch between driving worm screw 16 and clutch ring 80. This action prevents further relative rotation between driving worm screw 16 and control worm wheel 78. Pinion gear 70 continues to rotate relative to control ring gear 92, but control worm screw 72 is prohibited from further rotation as a result of the connection to driving worm screw 16 through control worm wheel 78 wrap spring 82 and clutch ring 80. Therefore, pinion gear 70 rotates relative to control worm screw 72 until the other angular drive faces on rib 98 in pinion gear 70 and rib 102 in control worm screw 72 engage. Further rotation of pinion gear 70 causes rotation of control worm screw 72, control worm wheel 78, clutch ring 80 and driving worm screw 16. Rotation of driving worm screw 16 about axis 38 causes driving worm screw 16 to move about the circumference of driving worm wheel 14 thereby adjusting the position of slack adjuster 10 relative to the brake cam shaft. As a result, when the brake actuator pushrod returns to its original rest position, the brake cam shaft rotates through a reduced angle to a new rest position to decrease the distance (or take up the slack) between the friction linings and friction surface to the predetermined clearance.

An automatic slack adjuster 10 for a vehicle brake in accordance with the invention represents an improvement as compared to conventional slack adjusters. In particular, the inventive slack adjuster 10 locates the one-way clutch along the axis 38 of the driving worm screw 16. As a result, the components of the clutch can be made larger than in conventional slack adjusters that locate the one-way clutch along the axis of the control worm screw. The larger size simplifies, design, manufacturing and repair and increases the strength of the clutch. Further, as compared to conventional slack adjusters that locate the one-way clutch along the axis of the driving worm screw, the inventive slack adjuster 10 simplifies design and assembly of the slack adjuster and limits stress on the control worm wheel 78.

While the invention has been shown and described with reference to one or more particular embodiments thereof, it will be understood by those of skill in the art that various changes and modifications can be made without departing from the spirit and scope of the invention.

What is claimed is:

1. An automatic slack adjuster for a vehicle brake, comprising:
    a housing configured for coupling to a brake actuator;
    a driving worm wheel supported by the housing and configured to engage a brake cam shaft of the vehicle brake;
    a driving worm screw supported by the housing and defining a threaded portion in mesh with the driving worm wheel and first and second shaft portions extending from opposite sides of the threaded portion, the driving worm screw configured to transfer a brake actuating force, imparted by the brake actuator to the housing, to the driving worm wheel and the brake cam shaft;
    a spring configured to apply a biasing force to the first shaft portion of the driving worm screw to bias the driving worm screw in a first direction; and,
    a wear adjustment mechanism including
        a reference arm assembly configured to be fixed against movement and including a control ring gear;
        a pinion gear in mesh with the control ring gear and configured for rotation about a rotational axis,
        a control worm screw coupled to the pinion gear for rotation with the pinion gear about the rotational axis;
        a control worm wheel disposed about the second shaft portion of the driving worm screw and in mesh with the control worm screw;
        a clutch ring disposed about the second shaft portion of the driving worm screw on an opposite side of the control worm wheel relative to the threaded portion of the driving worm screw, the clutch ring including a plurality of teeth configured for engagement with a corresponding plurality of teeth on the second shaft portion of the driving worm screw; and,
        a wrap spring engaging surfaces of the control worm wheel and the clutch ring
        wherein the control worm wheel and the clutch ring are arranged to ensure coaxial movement and a portion of the clutch ring is disposed radially inwardly of a portion of the control worm wheel.

2. The automatic slack adjuster of claim 1 wherein only the wrap spring is disposed between a radially outer surface of the second shaft portion of the driving worm screw and a radially inner surface of the control worm wheel.

3. The automatic slack adjuster of claim 2 wherein only the wrap spring is disposed between the radially outer surface of the second shaft portion of the driving worm screw and a radially inner surface of the clutch ring.

4. The automatic slack adjuster of claim 1 wherein the surfaces of the control worm wheel and the clutch ring comprise radially inner surfaces of the control worm wheel and the clutch ring.

5. The automatic slack adjuster of claim 1 wherein the spring acts on an axial end of the first shaft portion of the driving worm screw.

6. The automatic slack adjuster of claim 1, further comprising a thrust bearing disposed between the control worm wheel and the threaded portion of the driving worm screw.

7. The automatic slack adjuster of claim 1 wherein the pinion gear defines a first angular drive face and the control worm screw defines a second angular drive face disposed within a common plane with the first angular drive face and spaced from the first angular drive face by an angular gap corresponding to a predetermined clearance between a friction lining of the vehicle brake and a friction surface of the vehicle brake.

8. An automatic slack adjuster for a vehicle brake, comprising:
    a housing configured for coupling to a brake actuator;
    a driving worm wheel supported by the housing and configured to engage a brake cam shaft of the vehicle brake;
    a driving worm screw supported by the housing and defining a threaded portion in mesh with the driving worm wheel and first and second shaft portions extending from opposite sides of the threaded portion, the driving worm screw configured to transfer a brake actuating force, imparted by the brake actuator to the housing, to the driving worm wheel and the brake cam shaft;
    a spring configured to apply a biasing force to the driving worm screw to bias the driving worm screw in a first direction; and,
    a wear adjustment mechanism including
        a reference arm assembly configured to be fixed against movement and including a control ring gear;
        a pinion gear in mesh with the control ring gear and configured for rotation about a first rotational axis,
        a control worm screw coupled to the pinion gear for rotation with the pinion gear about the first rotational axis;
        a control worm wheel disposed about the second shaft portion of the driving worm screw and in mesh with the control worm screw, the control worm wheel configured for rotation about a second rotational axis;
        a clutch ring disposed about the second shaft portion of the driving worm screw on an opposite side of the control worm wheel relative to the threaded portion of the driving worm screw, the clutch ring including a plurality of teeth configured for engagement with a corresponding plurality of teeth on the second shaft portion of the driving worm screw; and,
        a wrap spring engaging surfaces of the control worm wheel and the clutch ring
        wherein a portion of the clutch ring and a portion of the control worm wheel are disposed in a common plane perpendicular to the second rotational axis.

9. The automatic slack adjuster of claim 8 wherein only the wrap spring is disposed between a radially outer surface of the second shaft portion of the driving worm screw and a radially inner surface of the control worm wheel.

10. The automatic slack adjuster of claim 9 wherein only the wrap spring is disposed between the radially outer surface of the second shaft portion of the driving worm screw and a radially inner surface of the clutch ring.

11. The automatic slack adjuster of claim 8 wherein the surfaces of the control worm wheel and the clutch ring comprise radially inner surfaces of the control worm wheel and the clutch ring.

12. The automatic slack adjuster of claim 8 wherein the control worm wheel and the clutch ring are arranged to ensure coaxial movement.

13. The automatic slack adjuster of claim 8 wherein the spring acts on an axial end of the first shaft portion of the driving worm screw.

14. The automatic slack adjuster of claim 8, further comprising a thrust bearing disposed between the control worm wheel and the threaded portion of the driving worm screw.

15. The automatic slack adjuster of claim 8 wherein the pinion gear defines a first angular drive face and the control worm screw defines a second angular drive face disposed within a common plane with the first angular drive face and spaced from the first angular drive face by an angular gap corresponding to a predetermined clearance between a friction lining of the vehicle brake and a friction surface of the vehicle brake.

\* \* \* \* \*

UNITED STATES PATENT AND TRADEMARK OFFICE
CERTIFICATE OF CORRECTION

| | | |
|---|---|---|
| PATENT NO. | : 11,209,062 B2 | Page 1 of 1 |
| APPLICATION NO. | : 16/412640 | |
| DATED | : December 28, 2021 | |
| INVENTOR(S) | : Deshpande et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 305 days.

Signed and Sealed this
Eighteenth Day of February, 2025

Coke Morgan Stewart
*Acting Director of the United States Patent and Trademark Office*